US012577820B2

(12) United States Patent
Dimercurio

(10) Patent No.: US 12,577,820 B2
(45) Date of Patent: Mar. 17, 2026

(54) DOOR BLOCK

(71) Applicant: Nicholas Dimercurio, Highlands Ranch, CO (US)

(72) Inventor: Nicholas Dimercurio, Highlands Ranch, CO (US)

( * ) Notice: Subject to any disclaimer, the term of this patent is extended or adjusted under 35 U.S.C. 154(b) by 0 days.

(21) Appl. No.: 18/741,724

(22) Filed: Jun. 12, 2024

(65) Prior Publication Data

US 2024/0418019 A1 Dec. 19, 2024

Related U.S. Application Data

(60) Provisional application No. 63/507,888, filed on Jun. 13, 2023.

(51) Int. Cl.
*E05F 5/02* (2006.01)
*E05C 17/00* (2006.01)
*E05C 17/54* (2006.01)

(52) U.S. Cl.
CPC ............ *E05C 17/54* (2013.01); *E05C 17/025* (2013.01)

(58) Field of Classification Search
CPC ........ E05C 17/00; E05C 17/54; E05C 17/025; E05C 19/004; E05C 19/18; E05C 19/182; E05F 5/00; E05F 5/06; E05F 5/02; E05Y 2201/21; E05Y 2201/218; E05Y 2201/224; Y10T 292/71; Y10T 292/73; Y10T 292/34; Y10T 292/15
See application file for complete search history.

(56) References Cited

U.S. PATENT DOCUMENTS

| | | | | | |
|---|---|---|---|---|---|
| 2,172,610 | A * | 9/1939 | Frank | E05C 17/54 16/86 A | |
| 4,443,508 | A * | 4/1984 | Mehl | B60J 10/33 16/86 A | |
| 4,688,761 | A * | 8/1987 | Wilcox | B25B 27/0035 29/239 | |
| D302,939 | S * | 8/1989 | Ruskin | D8/395 | |
| 5,011,203 | A * | 4/1991 | Tackett | E05C 17/54 292/DIG. 60 | |
| 6,616,128 | B2 * | 9/2003 | Selzer | E05C 17/54 52/712 | |
| 9,717,336 | B1 * | 8/2017 | Apple | A47C 3/04 | |
| 10,760,309 | B1 * | 9/2020 | Bowman | E05C 17/54 | |
| 10,883,297 | B1 * | 1/2021 | Seise | E05F 5/06 | |
| 2010/0242226 | A1 * | 9/2010 | Hopkins | E05C 17/54 16/82 | |
| 2012/0272482 | A1 * | 11/2012 | Evans | E05F 5/06 16/82 | |
| 2018/0142509 | A1 * | 5/2018 | Brown | E05F 5/06 | |
| 2019/0374864 | A1 * | 12/2019 | Cragle | A63H 3/003 | |

* cited by examiner

*Primary Examiner* — Chuck Y Mah
(74) *Attorney, Agent, or Firm* — Leyendecker & Lemire, LLC

(57) ABSTRACT

A door block is described. Embodiments of the door block can be implemented to keep a door from closing. The door block can be secured to a door, wedged underneath a door, and placed on a hinge connected to a door to stop the door from fully closing.

18 Claims, 7 Drawing Sheets

DOOR BLOCK

CROSS-REFERENCE TO RELATED APPLICATION

This application claims the benefit of U.S. Provisional Application No. 63/507,888, filed Jun. 13, 2023.

BACKGROUND

Door stopping devices are used to hold a door fully open, partially open, and/or completely closed. There are a number of door stops available each incorporating a different design. However, several issues are known with currently available door stops. From lack of ease of use to being a permanent fixture, a door stop adapted to be easily engaged and disengaged from a door is needed.

DETAILED DESCRIPTION

Figure 1A:
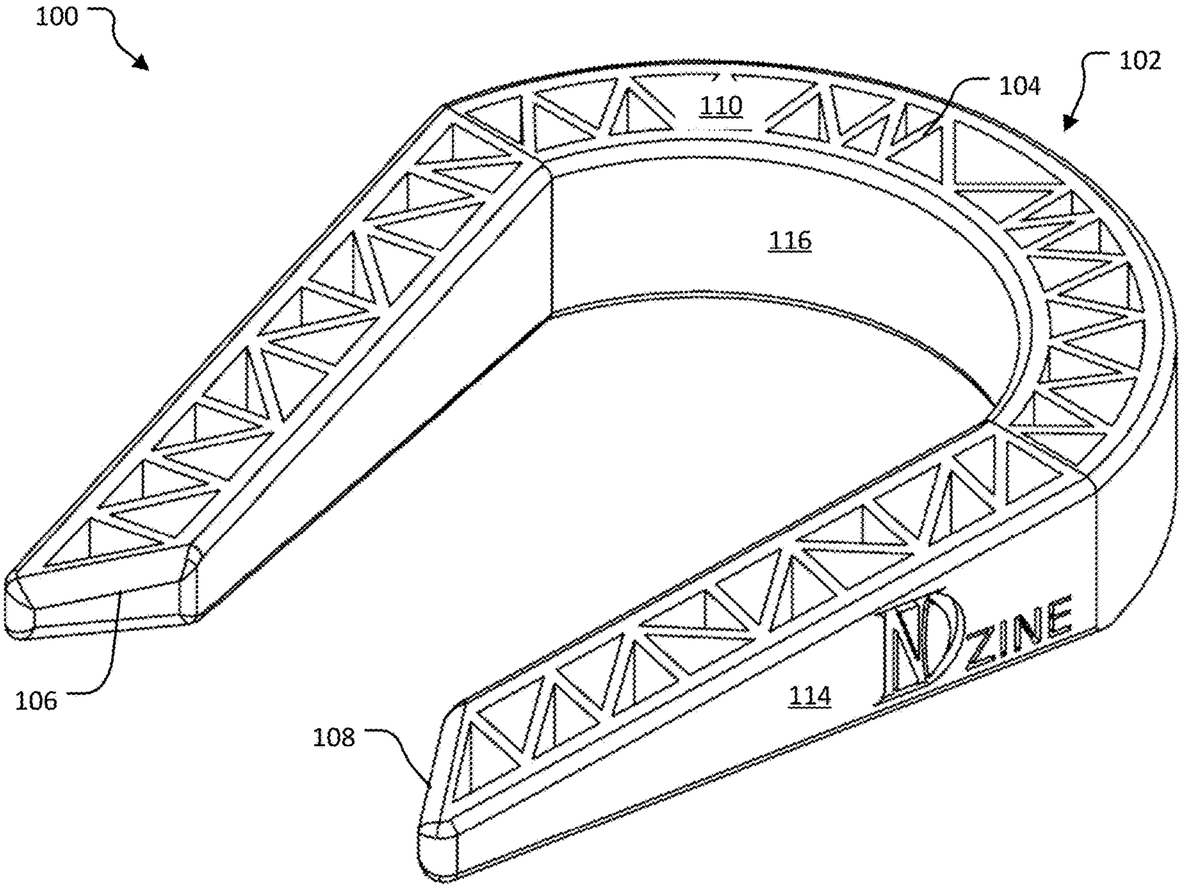
FIG. 1A is a perspective view of a door block according to one embodiment of the present invention.

Embodiments of the present invention include a multi-functional door block configured to prevent a door from completely closing. The door block can be easily engaged and disengaged from a door with relative ease by a user. Of significant note, the door block can be placed around several different locations of a door to prevent the door from fully closing. More specifically, the door block can be placed anywhere along a perimeter (top, bottom, sides) of a door, on a door hinge proximate a door, and can be implemented as a wedge inserted partially below a bottom of a door to prevent the door from fully closing. The door block can be manufactured to be lightweight, temperature resilient, slightly elastic, and allow for easy engagement with a door.

In one embodiment, the door block can typically be made from a rigid and resilient material in a substantially egg shaped "U" shape. The door block can generally have a middle section, a first extension, and a second extension. Distal ends of the extensions can be tapered to help engage and guide (or index) the door block onto a door. The slight elasticity of the material implemented to manufacture the door block can allow for slight flex where the protrusions flex outwards to receive a door therebetween. For instance, the distal ends can form a funnel to help a user index the door block with a door and flex to allow the extensions to pass around the door. In one instance, the middle section can generally be curved (e.g., a general "U" shape) with the first extension and the second extension extending away from the middle section and towards one another.

In one instance, the door block can be manufactured with a substantially egg shaped "U" shaped frame and a truss structure within the egg shaped "U" shaped frame. As can be appreciated, the truss structure can provide increased strength, durability, and elasticity. The truss structure may allow the door stop to withstand repeated slamming of heavy doors on the door stop while still maintaining the shape and structure of the door block and preventing damage to the doors. In some instances, the door block can be manufactured using three-dimensional printing. In other instances, the door block can be made from a unitary piece of material.

In general, the door block can be implemented to prevent a door from fully closing. The door block can be configured to removably couple to a door. Typically, an interior width between distal ends of the first extension and the second extension can be sized to be slightly smaller than a standard door thickness. The first extension and the second extension can taper in thickness from proximate the middle section down to the distal ends of the extensions. As can be appreciated, this can allow for the door stop to be slid underneath a bottom of a door to prevent the door from fully closing.

To engage a door, a user can push an open end of the door block towards a door. The tapered ends, which can resemble a funnel, can engage the door and expand outwards to receive the door therein. The opening of the door block can be slightly smaller than a thickness of the door. As such, the door block can be snuggly pushed onto and engage a door. Of note, the ends of the extensions can be tapered from an interior of the egg shaped "U" shape to an exterior of the body. As can be appreciated, this can help the door block engage and guide the door block in relation to varying width doors.

The door block can be implemented as a barrier to keep the door from fully closing. To stop the door from fully closing, the door block can have a minimum thickness to keep the door from fully closing while still being small enough to easily carry or store. Of significant note, and different from currently available door stops, an interior portion of the door block between the extensions proximate the middle section can be accessible (e.g., a user can fit a finger in the opening) to a user when the door block is engaged with a door. As can be appreciated, this can allow a user to place their fingers between the door block and the door to more easily grasp and remove the door block.

Of note, the door block can be sized to fit into the gap between the door and a door frame. For instance, the door block can be placed around a door hinge between the door and the door frame to keep the door from completely closing. At minimum, the door block can be implemented to keep a door from locking. As can be appreciated, this can allow for the door block to keep a door from closing completely and/or locking somebody in/out of a room. A typical door can have thickness of 1⅜". Doors in buildings can have a thickness of 1¾". It is to be appreciated that the door block can be sized to engage a variety of thicknesses. In general, the door block can be sized to receive a 1⅜" door or 1¾" door.

Embodiments of the door block are contemplated in varying sizes. A first door block can be smaller in size than a second door block, but both door blocks can be implemented substantially similar to the previously described door block. In one example, a second embodiment door block may have a solid construction with one or more holes for receiving an attachment device (or mechanism) therethrough. For instance, a paracord handle can be coupled to the second embodiment door block via the one or more holes. In some instances, the second embodiment door block can be implemented with objects other than doors. In other instances, the second embodiment door block can be used with smaller objects having doors that are designed to automatically close.

Embodiments of the door block can provide one or more improvements over currently available door stops. As will be evident and ascertainable from this disclosure, these improvements can include, but are not limited to, a more durable design, being able to withstand temperatures up to 420° F. and temperatures as low as −2° F., a design made to fit in a MOLLE panel, a material resistant to blunt force, a material that can flex and keep enough force on various thicknesses of a door, can be equipped with a hole for an attachment mechanism (e.g., a carabiner, paracord, etc.), and can be manipulated and stretched and still return to an original shape (e.g., elasticity).

In one embodiment, the door block can include a body having a top surface, a bottom surface, an interior surface, and an exterior surface. The body can be defined by a middle portion, a left extension, and a right extension. The middle portion can have a substantially "U" shape and a uniform thickness. The left extension can extend from a left side of the middle portion. The left extension can have a thickness tapering down from proximate the middle portion to a distal end of the left extension. The right extension can extend from a right side of the middle portion. The right extension can have a thickness tapering down from proximate the middle portion to a distal end of the right extension. Each of the distal ends of the left extension and the right extension can taper from the exterior surface to the interior surface of the body.

In another embodiment, the door block can include, but is not limited to, a substantially egg shaped "U" shaped body having a top surface, a bottom surface, and a middle section between the top surface and bottom surface having a varying thickness. The body can be defined by a middle portion, a left extension, and a right extension. The middle portion can have a uniform thickness. The left extension can have a thickness tapering down from proximate the middle portion to a distal end of the left extension. The right extension can have a thickness tapering down from proximate the middle portion to a distal end of the right extension. Each of the distal ends of the left extension and the right extension taper from an exterior of the distal end to an interior of the distal end.

In yet another embodiment, the door block can include a body having a top surface, a bottom surface, an interior surface, an exterior surface, and a plurality of trusses located between the interior surface and exterior surface. The body can be defined by, but is not limited to, a middle portion, a left extension, and a right extension. The middle portion can have a substantially "U" shape and a uniform thickness. The left extension can extend from a left side of the middle portion. The left extension can further have a thickness tapering down from proximate the middle portion to a distal end of the left extension. The right extension can extend from a right side of the middle portion. The right extension can have a thickness tapering down from proximate the middle portion to a distal end of the right extension.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Door Block

Figure 1B:
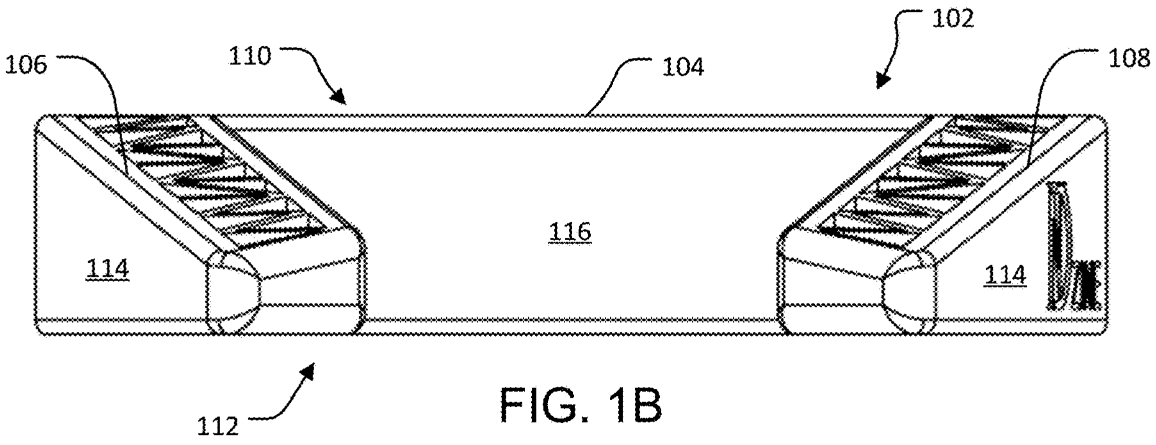
FIG. 1B is a front view of a door block according to one embodiment of the present invention.
Figure 1C:
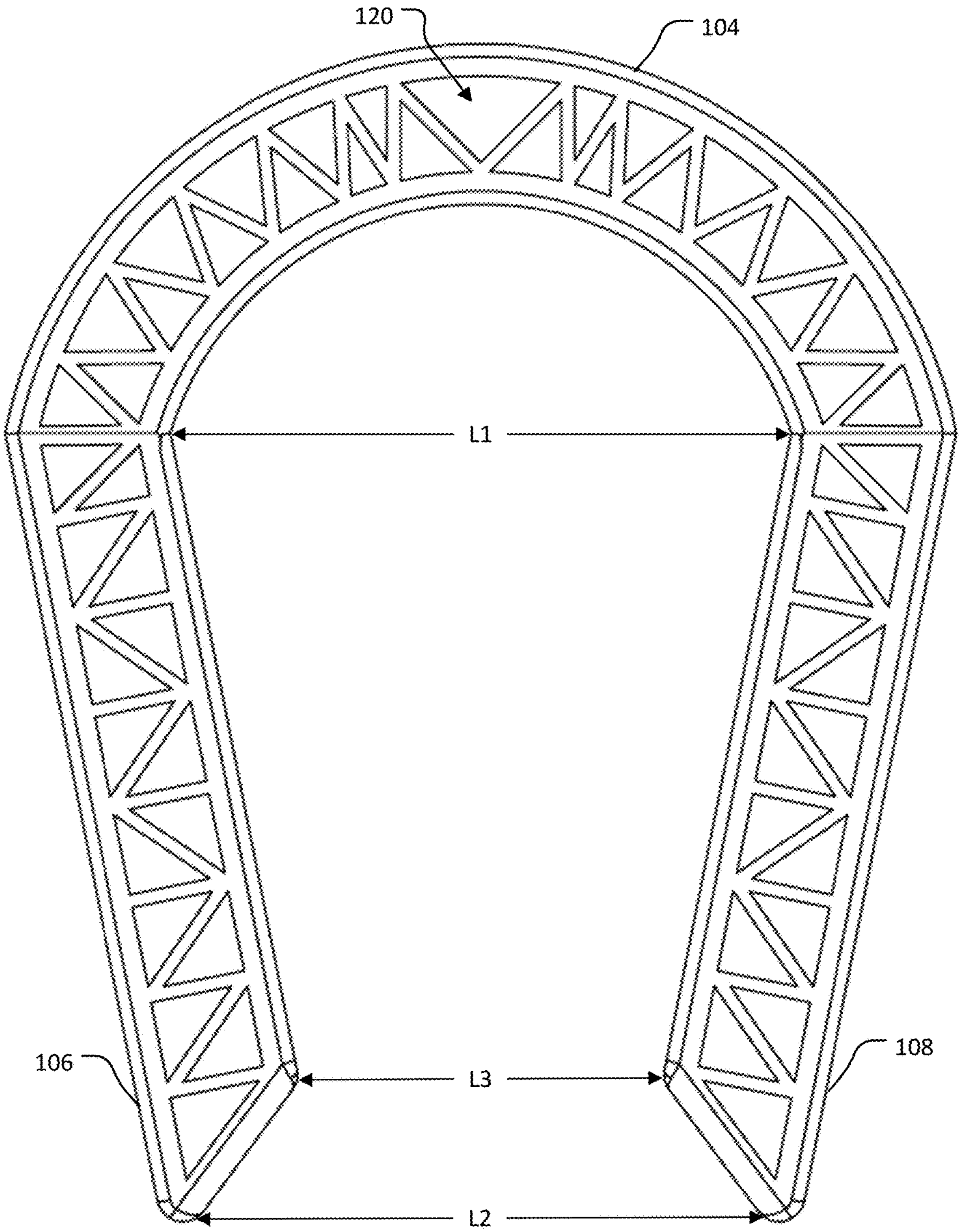
FIG. 1C is a top view of a door block according to one embodiment of the present invention.
Figure 1D:
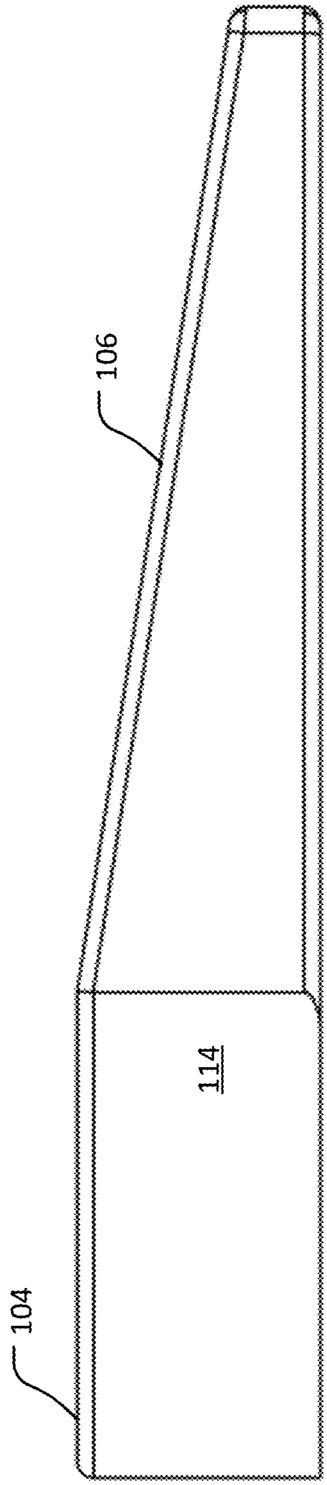
FIG. 1D is a left, side view of a door block according to one embodiment of the present invention.
Figure 1E:
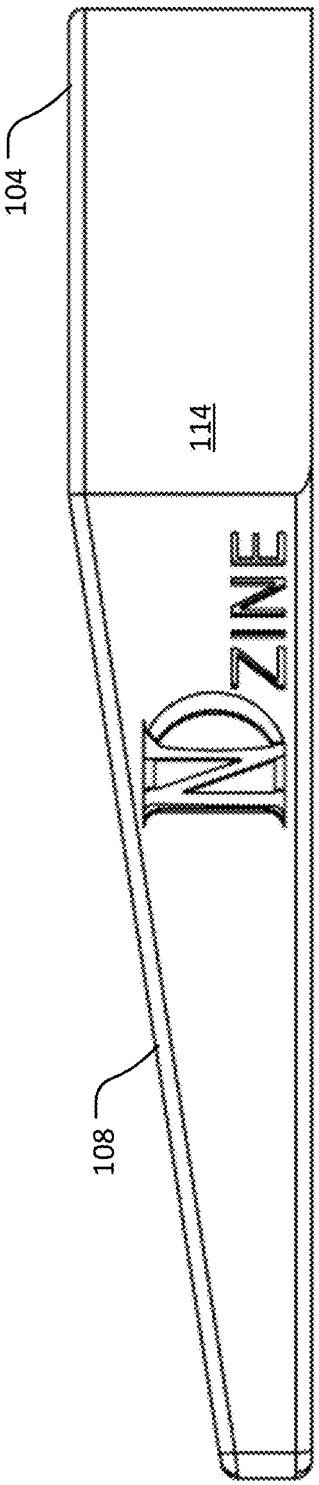
FIG. 1E is a right, side view of a door block according to one embodiment of the present invention.

Referring to FIGS. 1A-1E, detailed diagrams of an embodiment 100 of a door block 100 are illustrated. FIG. 1A includes a perspective view of the door block 100. FIG. 1B includes a front view of the door block 100. FIG. 1C includes a top view of the door block 100. FIG. 1D and FIG. 1E include side views of the door block 100.

As previously mentioned, the door block 100 can be implemented to keep a door ajar. In one example implementation, first responders can implement the door block 100 to keep a door open during an emergency. For instance, a first responder can implement the door block 100 to keep a door open to allow a following responder to be able to access a location where the door may lock unless the door is kept open. As can be appreciated, the door block 100 can be implemented to allow for other first responders to pass through a door that would normally be locked. The door block 100 can be implemented in an easy-to-use manner that can allow for a user to easily engage and disengage the door block 100.

As generally shown in the figures, the door block 100 can include a body 102 defined by a middle portion 104, a first extension 106, a second extension 108, a top surface 110, a bottom surface 112, an exterior surface 114, and an interior surface 116. The middle portion 104 can have a uniform thickness and be substantially "U" shaped. The first extension 106 can extend from a right side of the middle portion 104 and have a thickness that tapers down from proximate the middle portion 104 towards a distal end of the first extension 106. The second extension 108 can extend from a left side of the middle portion 104 and have a thickness that tapers down from proximate the middle portion 104 towards a distal end of the second extension 108.

Of note, and as shown in FIGS. 1A-1C, the distal ends of the first extension 106 and the second extension 108 can each taper from the exterior surface 114 to the interior surface 116. Stated alternatively, an exterior side length of the first extension 106 can be longer than an interior side length of the first extension 106. The second extension 108 can be similarly defined. As such, the distal ends of each extension 106, 108 may taper from the exterior side 114 to the interior side 114. As shown, the tapered ends of the extensions 106, 108 can form a funnel to help a user index the door block 100 with a door. A distance between the exterior surfaces of the distal ends of the extensions 106, 108 can be greater than a normal door. For example, the distance can be more than 1¾". A distance between the interior surfaces of the distal ends of the extensions 106, 108 can be less than a width of a door. In one example, the distance between interior surfaces of the distal ends of the extensions can be less than 1¾". The distal ends can be tapered to allow a user to easily engage a door when implementing the door block 100. By having an interior width that is less than the door width, the door block 100 can frictionally engage the door.

Referring to FIG. 1C, an interior width "L1", an interior width "L2", and an interior width "L3" are illustrated. The interior width "L1" can be a width between a maximum interior width between the first extension 106 and the second extension 108. The interior width "L2" can be a width between distal ends of the exterior surfaces of the extensions 106, 108. The interior width "L3" can be a width between distal ends of the interior surfaces of the extensions 106, 108. The interior width "L3" can typically be less than 1⅜" such that the extensions 106, 108 are flexed outwards when engaging a door. The interior width "L2" can typically be more than 1¾" to be able to guide a door towards an interior of the door block 100. Of significant note, a material selected to manufacture the door block 100 can limit a flex of the first extension 106 and the second extension 108 such that the interior width "L3" does not exceed or equal a width of the interior width "L1". The interior width "L2" can typically be less than the interior width "L1".

As shown generally in FIGS. 1A-1C, the first extension 106 and the second extension 108 can extend out from the middle portion 104 in a non-parallel direction. As shown and previously described, an interior width between the first extension 106 and the second extension 108 can generally decrease from proximate the middle 104 to the distal ends of the first extension 106 and the second extension 108. The door block 100 can be comprised of a rigid and resilient material able to withstand extreme temperatures. In general, a shape of the door block 100 may be similar to an egg shaped "U". More specifically, the middle portion may be "U" shaped with the first extension 106 and the second extension 108 extending towards one another similar to an outline of an egg.

In one embodiment, the door block 100 can be constructed with trusses. As shown, the trusses can be located within a frame including the middle portion 104, the first extension 106, and the second extension 108. The door block 100 can further include an aperture (or opening) 120 where an attachment mechanism 122 can be secured to the door block 100. The attachment mechanism 122 can be implemented to attach the door block 100 to clothing, bags, etc. of a user.

Figure 2A:
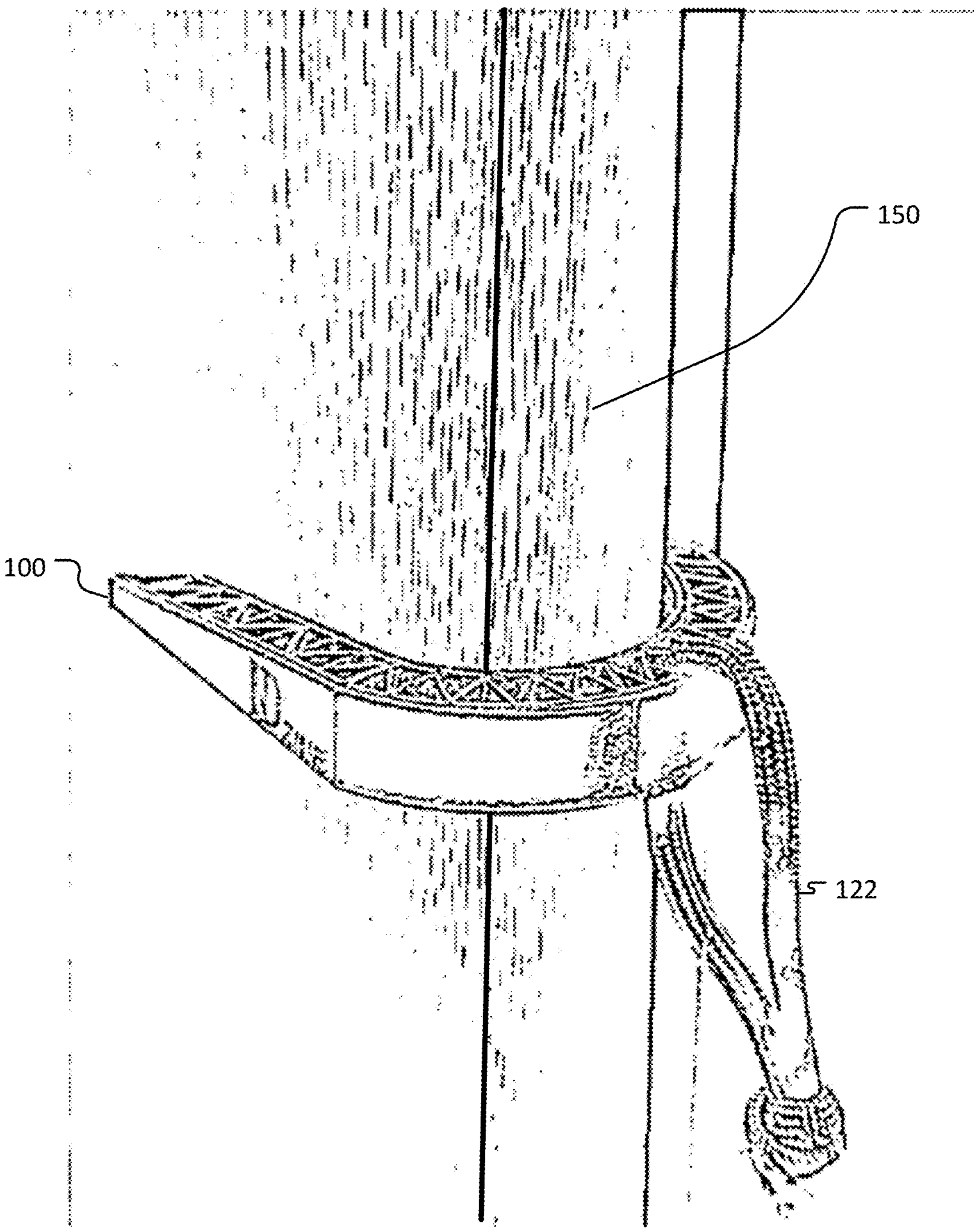
FIG. 2A is a view of a door block engaging a side of a door according to one embodiment of the present invention.
Figure 2B:
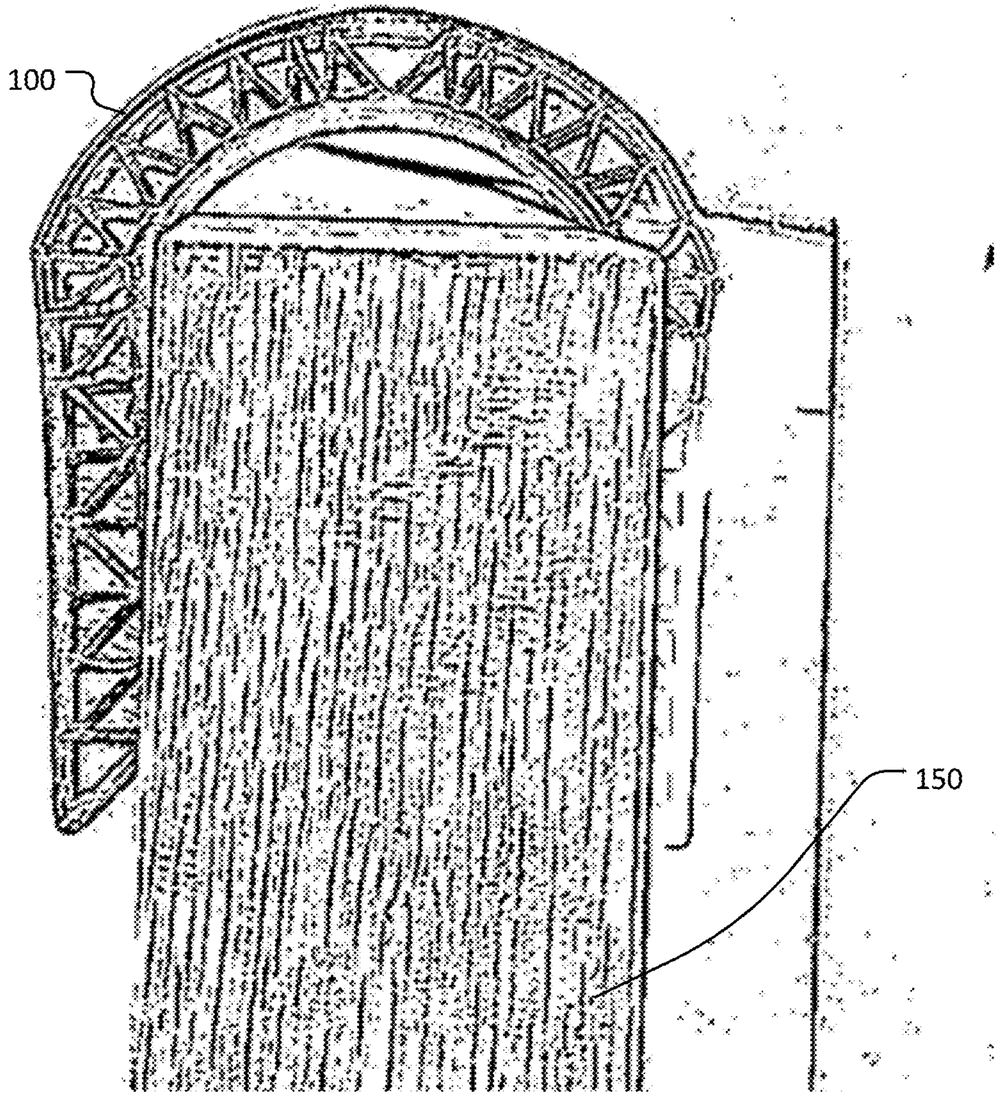
FIG. 2B is a view of a door block engaging a top of a door according to one embodiment of the present invention.
Figure 2C:
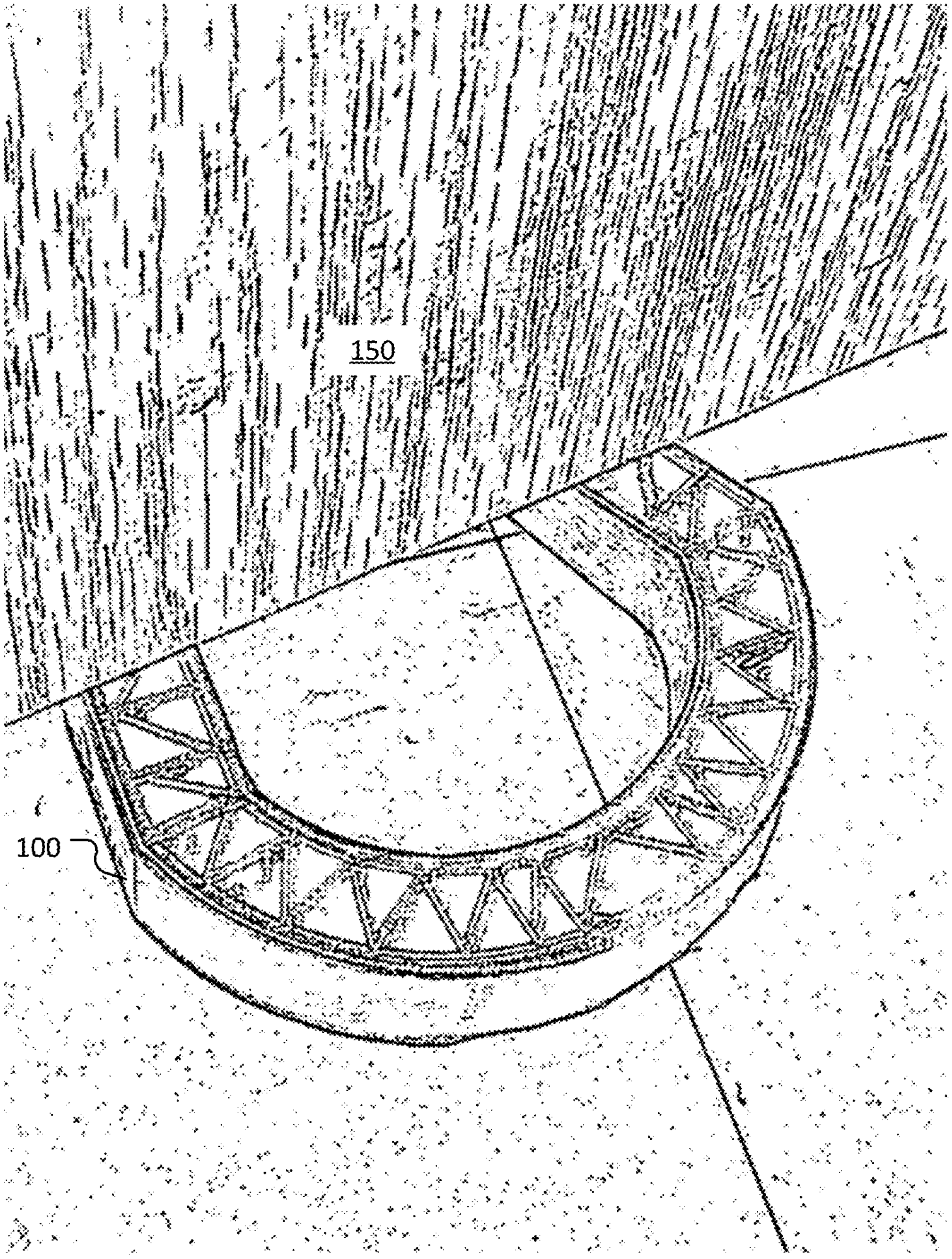
FIG. 2C is a view of a door block wedged underneath a door according to one embodiment of the present invention.
Figure 2D:
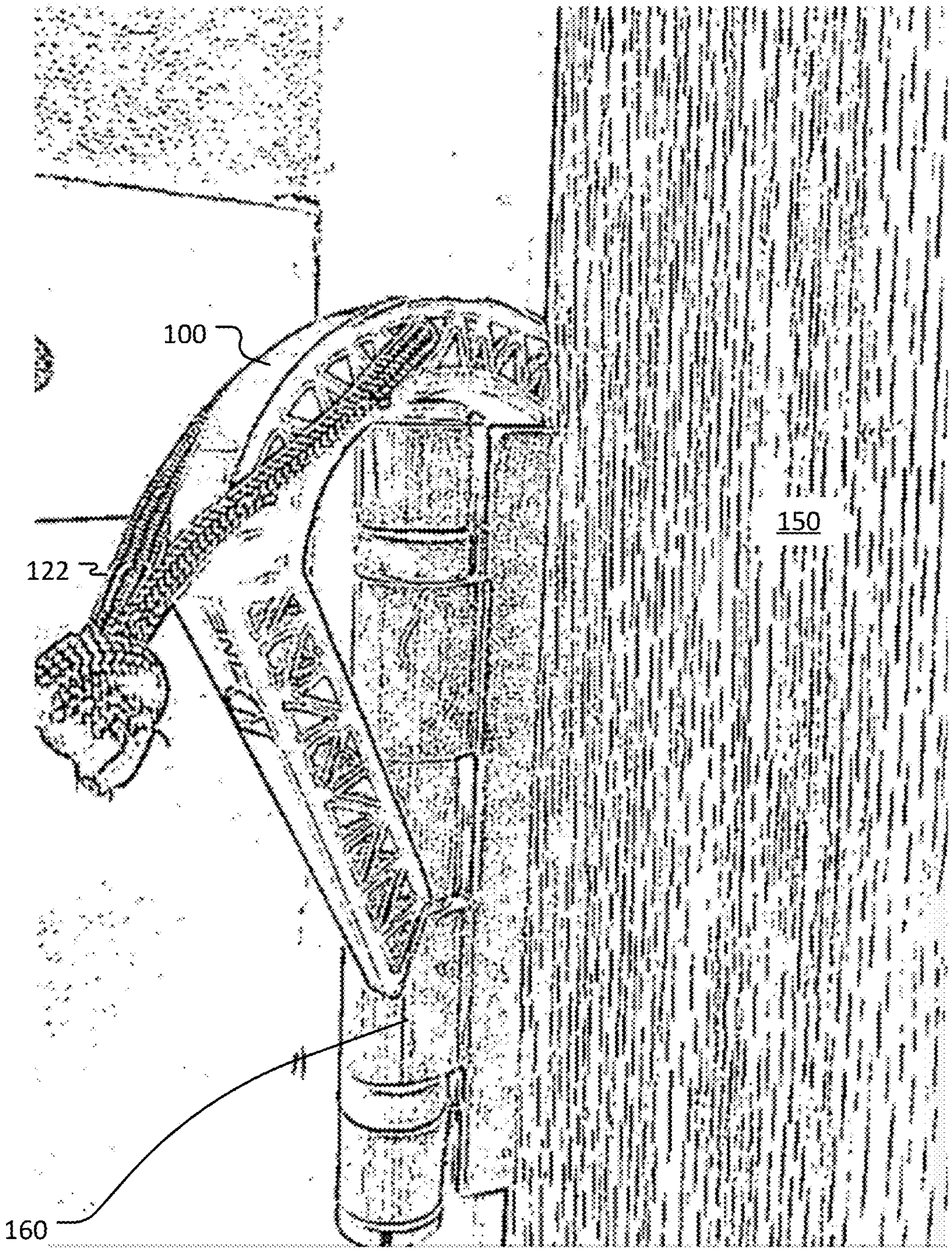
FIG. 2D is a view of a door block engaging a door hinge according to one embodiment of the present invention.

Referring to FIGS. 2A-2D, several different views of the door block 100 engaging a door 150 and a door hinge 160 are illustrated. FIG. 2A includes a view of the door block 100 engaging a side of the door 150. FIG. 2B includes a view of the door block 100 engaging a top of the door 150. FIG. 2C includes a view of the door block 100 being implemented as a wedge engaging a bottom of the door 150. FIG. 2D includes a view of the door block 100 engaging the door hinge 160. Of note, in each position, the door block 100 can be implemented to prevent the door 150 from fully closing.

A gap can be formed between an interior of the door block 100 and the door 150 when the door block 100 is engaged with the door 150. The gap can allow a user to easily insert a finger or two to pry the door block 100 off of the door 150. Of note, an elasticity of the material selected to manufacture the door block 100 and a width between the extensions 106, 108 can allow the door block 100 to snugly engage the door 150 without allowing the door block 100 to fully envelop the door 150. The gap between the door 150 and a door frame can be adjusted based on where the door block 100 can engage the door 150. In one instance, the gap can be the greatest when the door block 150 can be located proximate a side where the door is coupled to the door frame. In another instance, the gap can be the smallest when the door block can be located on a side of the door 150 opposite to where the door 150 can be coupled to a door frame.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A door block comprising:

a body having a top surface, a bottom surface, an interior surface, and an exterior surface, the body defined by:

a middle portion having a substantially "U" shape and a uniform thickness;

a left extension extending from a left side of the middle portion, the left extension having a uniform width tapering down from proximate the middle portion to a distal end of the left extension; and a right extension extending from a right side of the middle portion, the right extension having a uniform width tapering down from proximate the middle portion to a distal end of the right extension; and wherein (i) each of the distal ends of the left extension and the right extension taper from the exterior surface to the interior surface of the body defining a funnel for indexing the door block with a door; and (ii) the door block is adapted to engage one of a bottom, a side, a top, and a hinge of the door to stop the door from fully closing.

2. The door block of claim 1, wherein the body comprises trusses located within a frame, the frame including the interior surface and exterior surface of the body and the trusses including the top surface and the bottom surface of the body.

3. The door block of claim 1, wherein an interior width between the first extension and the second extension can decrease from proximate the middle portion to the distal ends of the first extension and the second extension.

4. The door block of claim 1, wherein the door block is comprised of a rigid and resilient material able to withstand extreme temperatures.

5. The door block of claim 1, wherein a distance between an interior of the distal ends of the left extension and the right extension is less than 1¾".

6. The door block of claim 1, wherein the body is a unitary piece of material.

7. The door block of claim 1, wherein the middle portion includes an aperture for receiving an attachment mechanism therethrough.

8. The door block of claim 1, wherein an exterior side length of the first extension can be longer than an interior side length of the first extension.

9. The door block of claim 1, wherein the body further includes a plurality of trusses.

10. A door block comprising:

a substantially egg shaped “U” shaped body having a top surface, a bottom surface, and a middle section between the top surface and bottom surface having a varying thickness, the body defined by:

a middle portion having a uniform thickness;

a left extension having a uniform width tapering down from proximate the middle portion to a distal end of the left extension; and a right extension having a uniform width tapering down from proximate the middle portion to a distal end of the right extension;

wherein (i) each of the distal ends of the left extension and the right extension taper from an exterior of the distal end to an interior of the distal end defining a funnel for indexing the door block with a door; and (ii) the door block is adapted to engage one of a bottom, a side, a top, and a hinge of the door to stop the door from fully closing.

11. The door block of claim 10, wherein the body includes a plurality of trusses.

12. The door block of claim 10, wherein an interior distance between distal ends of the left extension and the right extension is less than 1¾".

13. The door block of claim 10, wherein the door block is comprised of heat resistant material.

14. The door block of claim 10, wherein the door block is comprised of a rigid material.

15. The door block of claim 10, wherein the middle portion includes an aperture for receiving an attachment mechanism therethrough.

16. A door block comprising:

a body having a top surface, a bottom surface, an interior surface, an exterior surface, and a plurality of trusses located between the interior surface and exterior surface, the body defined by:

a middle portion having a substantially “U” shape and a uniform thickness;

a left extension extending from a left side of the middle portion, the left extension having a uniform width tapering down from proximate the middle portion to a distal end of the left extension; and a right extension extending from a right side of the middle portion, the right extension having a uniform width tapering down from proximate the middle portion to a distal end of the right extension;

wherein (i) each of the distal ends of the left extension and the right extension taper from an exterior of the distal end to an interior of the distal end defining a funnel for indexing the door block with a door; and (ii) the door block is adapted to engage one of a bottom, a side, a top, and a hinge of the door to stop the door from fully closing.

17. The door block of claim 16, wherein a gap between a door and an interior of the middle portion is formed when the door block is engaged with the door.

18. The door block of claim 16, wherein the door block has an egg shaped “U” shape.

* * * * *